No. 804,212. PATENTED NOV. 14, 1905.
W. R. CARY.
CHANGE SPEED GEARING.
APPLICATION FILED MAR. 6, 1905.
2 SHEETS—SHEET 1.
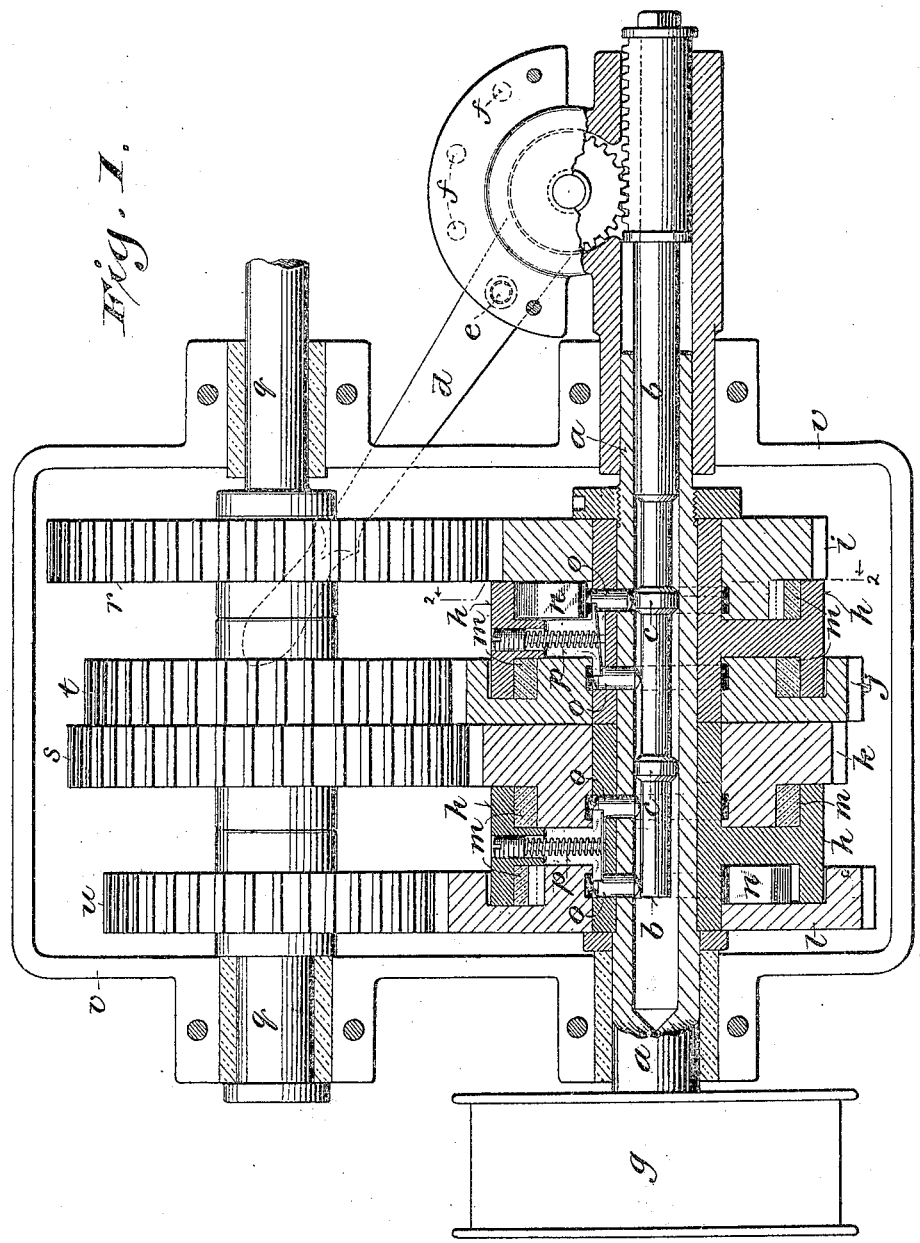

No. 804,212. PATENTED NOV. 14, 1905.
W. R. CARY.
CHANGE SPEED GEARING.
APPLICATION FILED MAR. 6, 1905.

2 SHEETS—SHEET 2.

Witnesses
Geo. W. Young.
Chas. L. Goss.

Inventor:
William R. Cary.
By Winkler Flanders Smith Bottum & Fawsett
Attorneys.

UNITED STATES PATENT OFFICE.

WILLIAM R. CARY, OF MILWAUKEE, WISCONSIN.

CHANGE-SPEED GEARING.

No. 804,212.      Specification of Letters Patent.      Patented Nov. 14, 1905.

Application filed March 6, 1905. Serial No. 248,451.

*To all whom it may concern:*

Be it known that I, WILLIAM R. CARY, a citizen of the United States, residing at Milwaukee, in the county of Milwaukee and State of Wisconsin, have invented certain new and useful Improvements in Change-Speed Gearing, of which the following is a specification, reference being had to the accompanying drawing, forming a part thereof.

This invention relates to variable-speed power-transmitting gearing in which one shaft or member is driven at different rates of speed from another shaft or member through intermeshing gears of different sizes, any one of the several pairs or trains of intermeshing gears being brought into action by a shifting device and clutch mechanism.

The main object of the invention is to relieve the shifting device and the operator from the work of engaging the clutches and to utilize the power which turns the gearing for operating or engaging the clutches.

It consists in certain novel features of construction and in the peculiar arrangement and combinations of parts hereinafter described and claimed.

In the accompanying drawings like letters designate the same parts in the several figures.

Figure 4:
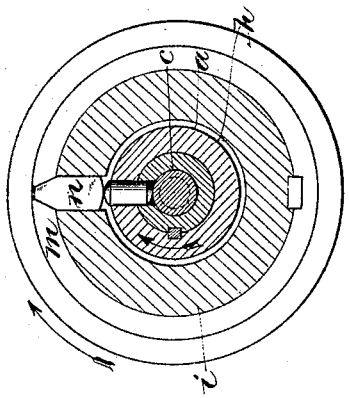
Figure 3:
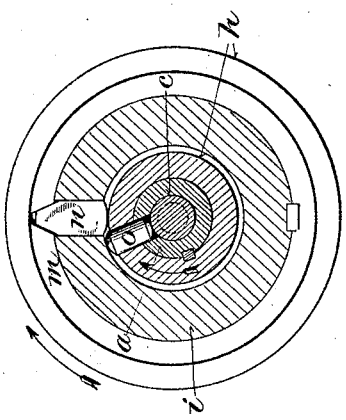
Figure 2:
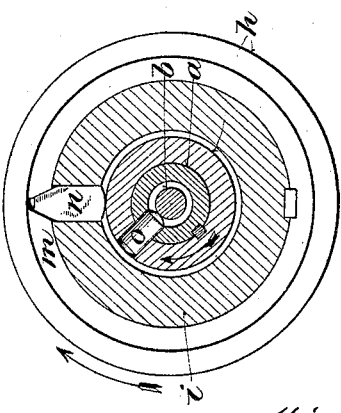

Figure 1 is a view, partly in section and partly in elevation, of one arrangement of change-speed gearing embodying the invention, the plane of the section cutting the driving and driven members of the gearing axially; and Figs. 2, 3, and 4 are similar sectional views in a plane indicated by the line 2 2, Fig. 1, at right angles to the axis of the driving member, showing one of the clutch-engaging devices in different positions.

While the invention is susceptible of embodiment in variable-speed power-transmitting gearing having more or less gears variously arranged and grouped for different purposes to provide for more or less changes in speed, for the purpose of illustration I have shown and will describe a simple arrangement of gearing comprising two sets of intermeshing gears mounted on two parallel shafts, either of which may be operated as the driving or driven member of the gearing. For the purpose of explanation the lower shaft (shown in Fig. 1) will be assumed to be the driving member, it being provided with a driving-pulley. Although this order or arrangement is preferable, it is to be understood that it is not essential to the successful operation of the gearing.

Referring to Fig. 1 of the drawings, $a$ designates what may be assumed, as above stated, to be the driving shaft or member of the gearing. It has an axial bore opening through one end, and in this bore is fitted a longitudinally-movable clutch operating or shifting rod $b$. This rod is formed or provided at suitable intervals, according to the number and arrangement of the gears, with collars or enlargements $c$, having beveled ends, and it is moved lengthwise in the bore of the shaft $a$ by any suitable means, such as a lever $d$, connected therewith by a rack and pinion and provided with a spring pin or bolt $e$, adapted to engage with any one of a series of depressions in a locking-plate $f$ to determine the position of said rod for bringing into action any pair of intermeshing gears and hold the rod in that position.

The shaft $a$ is provided with any suitable means, such as a pulley $g$, for communicating power thereto and turning it, and upon it are fixed friction-wheels $h$, having overhanging rims and extended hubs and constituting clutch members. Upon the hubs of these friction-wheels are loosely mounted driving-gears $i$, $j$, $k$, and $l$, in the present case four in number, although the number may be varied. Severed expansible friction-rings $m$, constituting the other members of the clutches, are loosely fitted between the overhanging rims of the friction-wheels $h$ and the hubs of the driving-gears, to which they are keyed opposite their severed sides. Loosely fitted in radial openings or recesses in the hubs of said gears are squared wedge-blocks $n$, having rounded inner ends and tapered or beveled outer ends projecting between and engaging the correspondingly-shaped ends of the severed rings $m$. These blocks bear normally at their inner ends upon the cylindrical hubs of the friction-wheels $h$, as shown in Fig. 2.

Loosely fitted in radial openings in the shaft $a$ and hubs of the wheels $h$ are pins $o$, having rounded ends, their outer ends being within or flush with the peripheries of the hubs of the wheels $h$ when their inner ends bear against the smaller or reduced portions of the rod $b$, as shown in Fig. 2. Adjacent to the outer ends of these pins, which are arranged in the same planes with the wedge-blocks $n$, the hubs of the driving-gears $i$, &c., are formed with annular recesses, which permit said pins to be thrust outward by the collars or enlargements $c$ on the rod $b$ beyond the peripheries of the hubs of the wheels $h$, as shown in Fig. 3, into position to engage with the inner ends of the wedge-blocks n, as shown in Fig. 4. The pins o are pressed inward and held against the rod b by springs p, and are thus prevented from rattling and wearing by striking at their outer ends against the inner ends of the wedge-blocks n when the clutches are disengaged.

q is the driven shaft, arranged parallel with the driving-shaft a and having fixed thereon gears r, s, t, and u, in mesh with the corresponding driving-gears i, j, k, and l. The gears are preferably inclosed in a case v, which is provided with bearings for the shafts a and q.

In the operation of the gearing to bring the gears i and r into action for turning the shaft q at the slowest rate of speed the lever d is moved to the position in which it is shown in Fig. 1 and in which it is held by the engagement of the spring-pin e with the first of the series of depressions in the locking-plate. This carries the right-hand collar or enlargement c on the rod b into engagement with the first pin o at the right, as shown in Fig. 1, thrusting said pin outward beyond the periphery of the hub of the associated friction-wheel h, as shown in Fig. 3. The shaft a, with the friction wheel and pin, turning in the direction indicated by arrows on Figs. 2, 3, and 4 while the associated gear i and friction-ring m stand still, the pin is carried into engagement with the inner end of the associated wedge-block n, as shown in Fig. 4, and thrusts said block outward, expanding the friction-ring m in the overhanging rim of the associated friction-wheel h and locking the gear i thereto. By turning the lever d a step farther to the left, so as to carry the spring-pin e into engagement with the second depression in the locking-plate f, the next larger driving-gear j will be locked in like manner to the associated friction-wheel h, the gear i having been first released from the associated wheel h by the movement of the rod b to the left. In this way each of the several pairs of gears may be brought into action one after another and the speed of the driven shaft q varied as desired within the limits provided for in the construction of the gearing.

It will be observed that in shifting from one speed to another the power that turns the driving-shaft expands the proper friction-ring, locking the associated driving-gear and friction-wheel together, and no force has to be exerted by hand except what is required to move the shifting-rod b and lever d from one position to another.

Various changes in the minor details of construction and arrangement of parts to adapt the gearing to different machines for different uses may be made without affecting its principle or mode of operation and without departing from the spirit and intended scope of my invention.

I claim—

1. In change-speed gearing the combination of two parallel shafts two sets of intermeshing gears, the gears of one set being fixed on one shaft and the gears of the other set being loosely mounted on the other shaft, clutches for severally locking the loose gears to the shaft on which they are mounted, clutch-engaging devices arranged to be operated by the power which turns the gearing, and a manually-operated shifting device for setting any one of the clutch-engaging devices in operative position, substantially as described.

2. In change-speed gearing the combination of a tubular shaft, gears of different sizes loosely mounted thereon, clutches for severally locking said gears on said shaft, radially-movable clutch-engaging devices carried by said gears, a shifting-rod movable lengthwise in said tubular shaft and provided with enlargements, pins movable lengthwise in radial openings in said tubular shaft and adapted to be severally thrust outward and held by the enlargement on said shifting-rod in position to operate said clutch-engaging devices and cause the rotation of one member of the gearing with relation to the other to lock the corresponding gears on said shaft, a shaft parallel with said tubular shaft and gears fixed thereon and meshing with the loose gears on said tubular shaft, substantially as described.

3. In change-speed gearing the combination of a tubular shaft, friction-wheels fixed on said shaft and having laterally-projecting rims, gears of different sizes loosely mounted on the hubs of said friction-wheels, expansible friction-rings interposed between the hubs of said gears to which they are secured and the overhanging rims of said friction-wheels, radially-movable wedge-blocks carried by said gears and adapted when thrust outward to expand said friction-rings and lock said gears to the associated friction-wheels, a shifting-rod movable lengthwise in said tubular shaft and provided with enlargements, pins loosely held in radial openings in said tubular shaft, and the hubs of said friction-wheels and adapted to be thrust outward one at a time by the enlargements on said shifting-rod into operative relation to said wedge-blocks, a shaft parallel with said tubular shaft and gears fixed thereon and meshing with the corresponding loose gears on said tubular shaft, substantially as described.

4. In change-speed gearing the combination of a shaft, a rod movable lengthwise therein and provided with enlargements, friction-wheels fixed on said shaft and having laterally-projecting rims, gears loosely mounted on the hubs of said friction-wheels and having annular recesses in their hubs intersected by radial recesses, wedge-blocks loosely held in said radial recesses, expansible friction-rings interposed between the hubs of said gears and the rims of said friction-wheels and engaged at their severed ends by the tapered portions of said wedge-blocks, radially-movable pins loosely held in radial recesses in the hubs of said friction-wheels and arranged to be thrust outward by the enlargements on said longitudinally-movable rod into the annular recesses in the hubs of said gears, and gears meshing with the aforesaid gears, substantially as described.

5. In change-speed gearing the combination of a shaft, a longitudinally-movable rod having enlargements, gears loosely mounted on said shaft, clutches for severally locking said gears on said shaft, a radially-movable device applied to and movable with one member of each clutch, radially-movable pins movable with the other members of the clutches and adapted to be thrust outward into operative relation to the clutch-engaging devices by the enlargements on said longitudinally-movable rod, and power-transmitting gears connected with said loose gears, the gears of one set being of different sizes, substantially as described.

In witness whereof I hereto affix my signature in presence of two witnesses.

WILLIAM R. CARY.

Witnesses:
   MAUDE L. EMERY,
   CHAS. L. GOSS.